A. F. COOPER.
CARRIAGE AND RAILROAD CAR WHEELS.

No. 103,573.  Patented May 31, 1870.

Witnesses,
W. J. Cambridge
L. E. Batchelder

Inventor,
Almond F. Cooper
by his Attorneys
Tachenmacher & Stearns

United States Patent Office.

ALMOND F. COOPER, OF SAN FRANCISCO, CALIFORNIA.

Letters Patent No. 103,573, dated May 31, 1870.

IMPROVEMENT IN CARRIAGE AND RAILROAD-CAR WHEELS.

The Schedule referred to in these Letters Patent and making part of the same.

To all whom it may concern:

Be it known that I, ALMOND F. COOPER, of San Francisco, in the county of San Francisco and State of California, have invented certain Improvements in Wheels for Carriages, Railroad Cars, and other vehicles, of which the following is a full, clear, and exact description, reference being had to the accompanying drawing making part of this specification, in which—

My present invention particularly relates to certain improvements in wheels for cars, carriages, &c., for which Letters Patent of the United States were granted to me on the 15th day of February, A. D. 1870, and the object of my present invention is to provide additional means for rendering the wheel elastic, as well as for increasing its strength and durability, and consists in an auxiliary elastic packing interposed between the inner surface of one or both covering-plates and the outer surface of the wheel, one or both sides of which are provided with a circular flange or projection of a diameter exceeding that of the covering-plate, in order that the wheel may receive the said plate and packing, the latter being of a diameter exceeding that of the inside of the flange, so that, when the plate is secured in place, the packing will lap over its outer edge and snugly and completely fill the space between it and the flange, the covering plate being free to yield in a vertical as well as in a lateral direction when the wheel passes over an uneven track or road, and the concussion and noise incident to the use of wheels of the ordinary construction are thereby avoided, and My invention also consists in providing the wheel, on one or both sides, with one or more series of projections, surrounded by elastic sleeves or thimbles, which fit into recesses in the covering-plate, and act as springs or buffers, whereby the necessary elasticity is insured, and greater strength afforded than where solid rubber blocks are employed, as shown and described in my aforesaid Letters Patent of February 15, A. D. 1870.

To enable others skilled in the art to understand and use my invention, I will proceed to describe the manner in which I have carried it out.

In the said drawing—

A is a solid wheel, with only a circular opening at its center, in which snugly fits a rubber block, B, surrounding an axle, C.

Figure 1:
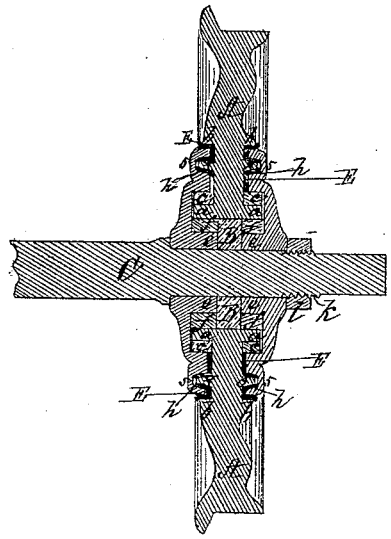
Figure 1 is a central longitudinal section through my improved wheel, in place upon its axle.
Figure 3:
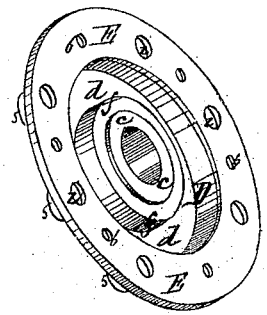
Figure 3 is a perspective view of the inner side of one of the covering-plates.

Each side of the wheel has, projecting from it, and formed in one and the same piece therewith, two circular flanges, $a\ b$, the inner circular flange, $a$, of which is surrounded by a circular ring of rubber, $c$, and the outer circular flange, $b$, is of such diameter as will inclose a space sufficiently large to receive a covering-plate, D, provided with an elastic packing, E, fitted to its inner side, the diameter of the circular flange $b$ being greater than the diameter of the covering-plate D, and the diameter of the elastic packing E being greater than that of the inside of the flange $b$, so that, when the covering plate is in place, the packing will occupy the space between the flange $b$ and elastic ring $c$, and be interposed not only between the inside of the covering-plate and the outside of the wheel, but also between the outer edge of the covering-plate and the inside of the flange $b$, the packing lapping and folding over the outer edge of the covering-plate in such manner as to snugly and completely fill the space between them, whereby the plate is free to yield gradually in a vertical as well as in a lateral direction, (see fig. 1.)

The covering-plate D is provided with a groove, $d$, within which and around the central boss or projection, $e$ of the plate, is fitted an elastic ring, $f$, which fits snugly within the flange $a$ of the wheel.

Figure 2:
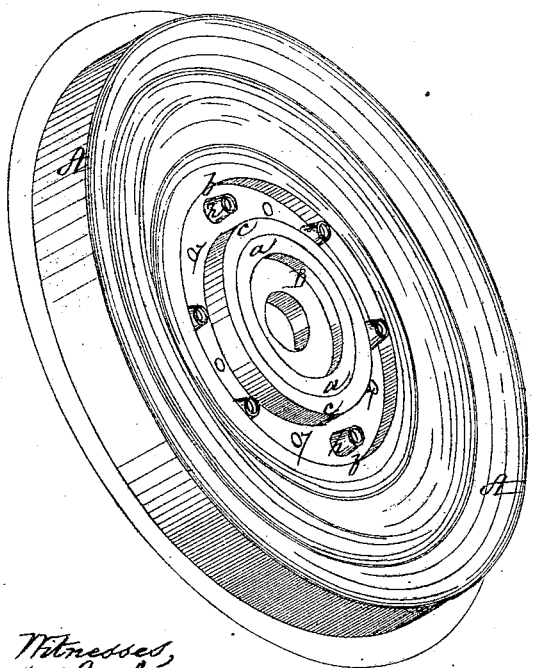
Figure 2 is a perspective view of my improved wheel with one of its covering plates removed.
Figure 4:
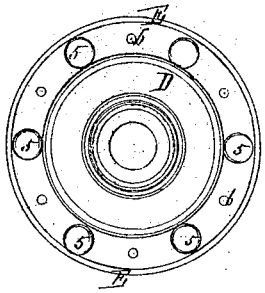
Figure 4 is a plan of the outer side of the same.

On each side of the wheel A, within the space inclosed by the two flanges $a\ b$, is formed (in one and the same piece as the wheel) a series of projections, $g$, surrounded by a series of rubber sleeves or thimbles, $h$, (see fig. 2,) which are of a greater length than the projections $g$, and fit into a series of circular recesses, $i$, (fig. 1,) formed in the covering-plate D, and extending through the packing E secured thereto, the thickness of the portion of the plate D where the recesses $i$ are formed being increased at 5, so as to insure the necessary degree of strength, and the depth of the recesses $i$ is a little less than that of the elastic sleeves $h$, so that they will be compressed when the plates D are properly secured in place.

These rubber sleeves act as buffers or cushions, and, in connection with the elastic rings $c\ f$, and packing E, serve to support the weight upon the wheel, which is thus allowed to have a slight motion, independently of the axle, in passing around curves, whereby the concussion and noise incident to wheels of the ordinary construction are avoided, and the wear of the parts materially reduced. The principal office of the buffers, however, is to prevent the wheel from turning independently of the plates D, which, after being fitted in place upon the sides of the wheels, are forced, by hydraulic or other pressure, until the packing E, sleeves $h$, and rings $c\ f$ are compressed to a sufficient degree, and in this position the plates are securely held by bolts passing through holes 6 7 in the plates D and the wheel A, the holes in the latter being made sufficiently large to allow the plates to yield.

The covering-plates are now bored out to receive the axle, and the wheel, with its plates, is forced tightly thereon.

Near one end of the axle C is cut a screw-thread, $k$, over which is turned a nut, $l$, which bears on the covering-plates D, which is thus kept in place with additional security. Instead of only one series of projections $g$, (on each side of the wheel) surrounded by rubber sleeves $h$, two or more series of projections may be employed, and the projections may be surrounded with sleeves of some elastic material other than rubber, or stiff spiral springs may be used in lieu of the elastic sleeves.

It is evident that my improvements may be applied to carriage-wheels, for ordinary roads, in which case the axle-box will pass through the central opening in the wheel and the plates D, and will be firmly secured to the latter.

Claims.

What I claim as my invention, and desire to secure by Letters Patent, is—

The wheel A, with one or more flanges $b$, in combination with elastic packing E, and one or more covering-plates D, provided with recesses $i$, to receive one or more series of elastic buffers or springs $h$, the whole being constructed and operating substantially in the manner and for the purpose set forth.

Also, one or more series of projections $g$, formed in one and the same piece with the wheel, and surrounded by elastic sleeves or thimbles $h$, in combination with one or more covering-plates D, provided with recesses $i$, for their reception, substantially as and for the purpose described.

Witness my hand this 28th day of April, A. D. 1870.

ALMOND F. COOPER.

Witnesses:
N. W. STEARNS,
W. J. CAMBRIDGE.